United States Patent [19]
Falater

[11] 4,338,632
[45] Jul. 6, 1982

[54] REMOTE CONTROL SYSTEM FOR TELEVISION MONITORS

[75] Inventor: Scott L. Falater, Brookfield, Ill.

[73] Assignee: Zenith Radio Corporation, Glenview, Ill.

[21] Appl. No.: 194,163

[22] Filed: Oct. 6, 1980

[51] Int. Cl.³ .............................................. H04N 5/44
[52] U.S. Cl. ............................. 358/194.1; 340/825.63
[58] Field of Search ................ 358/194.1, 21 R, 21 V, 358/23, 28, 29, 32, 40, 141, 142, 146, 147; 340/694, 695, 167 R, 167 A, 168 R, 168 B

[56] References Cited
U.S. PATENT DOCUMENTS

| | | | |
|---|---|---|---|
| 2,887,529 | 5/1959 | Gortner | 358/194.1 |
| 3,827,026 | 7/1974 | Viswanathan | 340/167 R |
| 3,854,123 | 12/1974 | Banach | 358/194.1 |
| 3,973,241 | 8/1976 | Streckenbach | 340/167 R |
| 3,987,414 | 10/1976 | Tuma | 358/194.1 |
| 4,045,777 | 8/1977 | Mierzwinski | 340/694 |
| 4,246,611 | 1/1981 | Davies | 358/194.1 |

OTHER PUBLICATIONS

A Pulse Position Modulation Transmission System for Remote Control of a TV Set, Casier, et al., IEEE Journal of Solid State Circuits, vol. SC-11, No. 6, pp. 801-808, Dec. 1976.

Primary Examiner—Michael A. Masinick

[57] ABSTRACT

A system is described for remotely adjusting the control functions, such as hue, volume and the like, of a television monitor. The system includes an encoder for generating a repetitive multi-channel signal whose period is constant, each channel including a control pulse having a parameter (such as pulse period or pulse width) which is variable by user-operable controls included in the encoder. A remotely located decoder, associated with the monitor, receives the multi-channel signal and converts each control pulse to an output signal whose value is a function of the variable pulse parameter so as to develop a multi-channel output signal for application to and adjustment of the monitor's control functions.

21 Claims, 18 Drawing Figures

ENCODER

FIG. 6

DECODER

ENCODER FIG.15

DECODER
FIG. 16

REMOTE CONTROL SYSTEM FOR TELEVISION MONITORS

BACKGROUND OF THE INVENTION

This invention is directed generally to television displays, and particularly to a system for remotely controlling the operation of a television monitor.

Modern technology has produced a number of products such as video disk players, video cassette players and the like which develop video signals. All such signals may be used to generate corresponding video images on one or more television monitors which may be located at a spot remote from the source of video signals.

In some instances, it is desirable to switch the monitor's source of video signals from a video disk player to a cassette player, for example, or to any other source of video signals. When such a switch is made, the video signals from the second video source may vary from those provided by the first video source such that a change in hue is experienced in the image which is reproduced by the monitor. Brightness, contrast, and other changes may also result when the video input to the monitor changes.

Conventionally, each monitor includes user-operated controls for adjusting the hue, brightness and other variables associated with the reproduced images. However, it is frequently inconvenient for a user to physically adjust all the controls associated with each monitor whenever the source of video signals is changed. Consequently, it is desirable for a user to be able to remotely adjust each monitor whenever such adjustment is needed, particularly when the source of video signals is changed.

Conventional television technology does not presently offer a reliable and inexpensive way for a user to remotely adjust the images reproduced by television monitors. In other arts, such as remotely-controlled airplanes, an encoder is used for sending a plurality of control pulses to a decoder aboard the airplane. Each control pulse carries information to adjust one of the airplane's control functions. However, because the pulses received by the decoder do not occur at a constant rate, their decoding in a television environment would require more complex and expensive circuitry than is desirable.

OBJECTS OF THE INVENTION

It is a general object of the invention to provide a system for easily and inexpensively adjusting the control functions of television monitors by remote control.

It is a more specific object of the invention to provide a user-operated encoder for encoding instructions for television monitors, and a remote decoder associated with the monitor for converting the encoded instructions to D.C. voltages for adjusting various image controls and other functional controls associated with the monitor.

BRIEF DESCRIPTION OF THE FIGURES

The objects stated above and other objects of the invention are set forth more particularly in the following detailed description and in the accompanying drawings, of which.

DESCRIPTION OF THE PREFERRED EMBODIMENT

Figure 1:
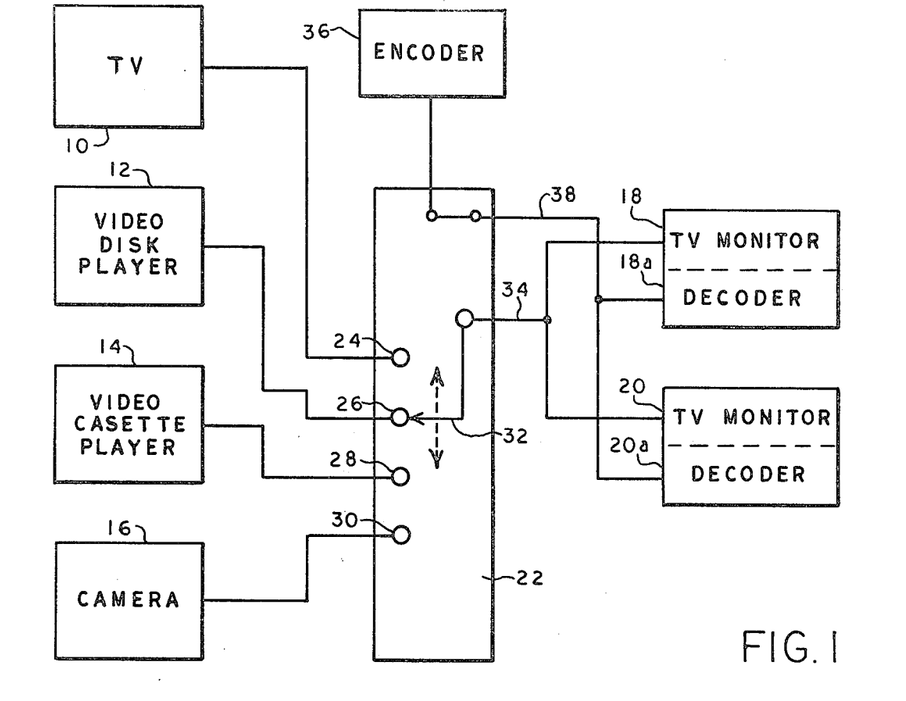
FIG. 1 is a schematic representation of an encoding and decoding system for remotely adjusting the control functions of one or more television monitors.

Referring now to FIG. 1, a plurality of exemplary video signal sources are shown in an arrangement wherein the signals from any one of the sources may be converted to an image on one or more television monitors. As shown, the video signal sources may include a television receiver 10, a video disk player 12, a video cassette player 14, and a camera 16.

For purposes of illustration, a pair of television monitors 18 and 20 are shown, both of which can simultaneously convert the video signals from one of the sources 10–16 to images.

To select one of the signal sources for coupling to the monitors 18 and 20, a switch 22 is included. As shown, the switch 22 includes input contacts 24, 26, 28, and 30, each of which receives video signals from one of the sources 10–16. Also included is a switch arm 32 which is coupled to the inputs of monitors 18 and 20 via a cable 34. Placing the switch arm 32 in contact with one of the contacts 24–30 couples one of the signal sources to the monitors.

As mentioned above, the monitors may include a number of control functions such as hue, contrast, volume and the like. Conventionally, all such functions may be adjusted by user-operable knobs (not shown) on the monitors. However, with the knobs set for proper operation when the arm 32 couples the player 12 to the monitors, the knobs may need adjustment when the arm 32 is switched to the cassette player 14.

To permit remote adjustment of the control functions associated with the monitors 18 and 20, an encoder 36 is included. The encoder generates a multichannel control signal (one channel for each of the monitor's control functions) which is coupled to a pair of decoders 18a and 20a via a transmission path 38. As described in more detail below, the multi-channel signal developed by the encoder 36 is a time-division multiplexed signal wherein each channel of the signal includes a control pulse having a parameter which is variable by user-operable controls (not shown) associated with the encoder 36. The decoders 18a and 20a convert the control pulses to a corresponding number of D.C. signals for use in automatically adjusting the control functions, such as hue or brightness, which are associated with the monitors. With this arrangement, one encoder may simultaneously control a plurality of remotely located monitors.

Figure 2:
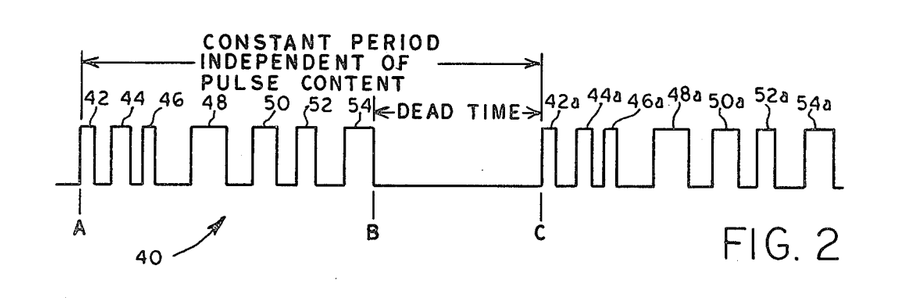
FIG. 2 illustrates a multi-channel control signal developed by the encoder of FIG. 1 according to the invention.

Referring now to FIG. 2, one type of multichannel signal 40 is shown which may be developed by the encoder 36. The illustrated signal has a constant period which extends from A to C and which repeats continuously. Included within the period A-C is a start pulse 42, six consecutive control pulses 44-54, and a dead time extending from B to C. Each of the control pulses 44-54 is associated with one of six channels, and each channel is intended to control one of the functions of the monitors.

Figure 3:
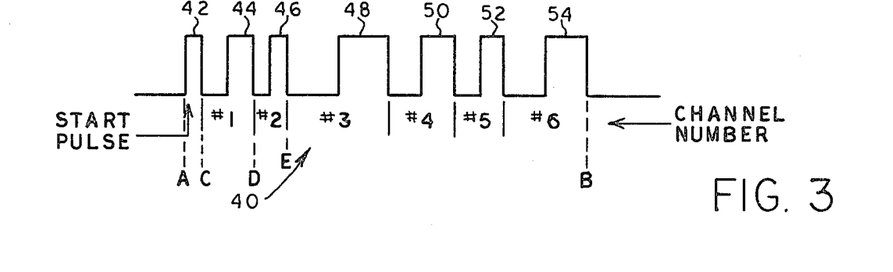
FIG. 3 is an expanded view of the interval A-B of FIG. 2.

As shown in FIG. 3, the control pulse 44 is associated with channel No. 1, control pulse 46 is associated with channel No. 2, and so on. In addition, each of the six control pulses has a pulse period which is variable. For example, the pulse period of control pulse 44 extends from C to D, and the pulse period of control pulse 46 extends from D to E. By varying the duration of the pulse period C-D, the information content of channel No. 1 is varied. Likewise, varying the duration of the pulse period D-E varies the information content of channel 2. The information content of the other channels is varied in the same manner.

It will be appreciated that variations in the pulse periods of the various channels will also vary the interval from A to B, and thereby vary the length of the dead time interval B-C (FIG. 2). The latter interval is included to provide a reset function for the decoders so that the encoding-decoding system is self-clocking, and variations in the dead time interval do not adversely affect that function. In the embodiment described below, the dead time amounts to about thirty percent of the total period A-C even when all the pulse periods are set to their maximum. Irrespective of such variations, the signal repetition period A-C is held constant and is repeated continuously. As shown in FIG. 2, another start pulse 42a begins immediately after time C, and another six control pulses 44a-54a are transmitted.

It will be appreciated that the multi-channel signal will include one channel for each monitor control function which is to be remotely adjusted. In addition, the encoder 36 preferably includes one user-operable knob or the like for varying the pulse period of each channel. For example, one knob may control the pulse period of channel No. 1 for varying the hue of the images developed by the monitors. Additional knobs will ordinarily be included for varying the brightness and contrast of the monitor images by varying the pulse periods associated with two additional channels.

Figure 4:
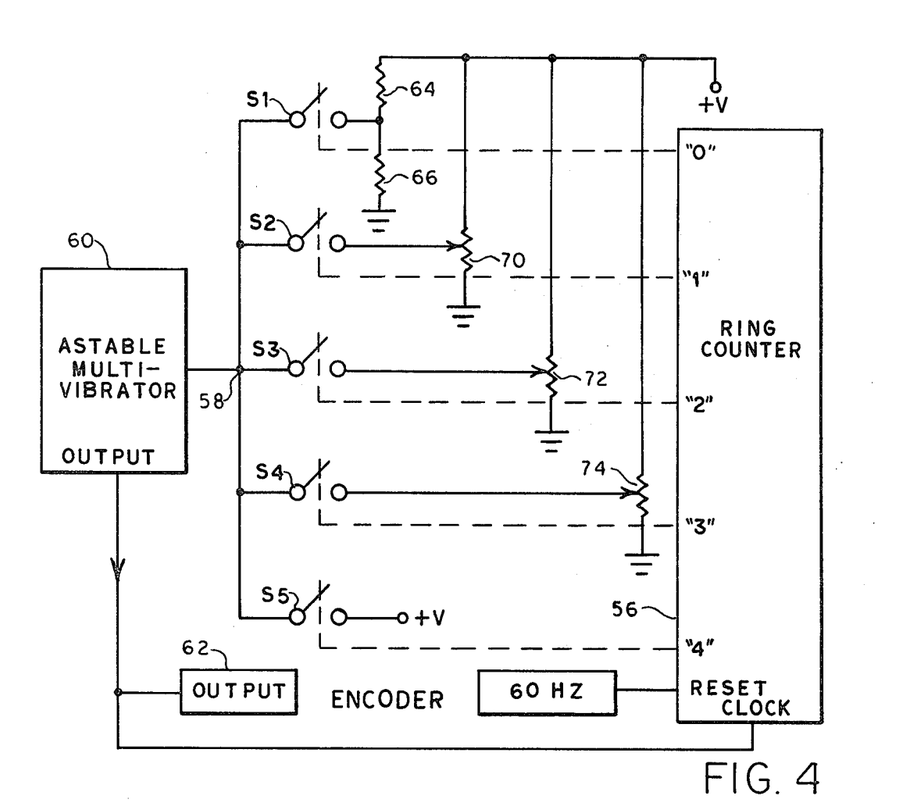
FIG. 4 depicts one embodiment of the encoder shown in FIG. 1.

Referring now to FIG. 4, a schematic block diagram is shown of one embodiment of the encoder 36 which develops a multi-channel signal of the type shown in FIGS. 2 and 3. This particular embodiment is for a three channel encoder, but additional channels may be included as desired.

As shown, the encoder includes a so-called ring counter 56 whose outputs are identified as "0" through "4". Each of these outputs, when high, operates to close one of five switches S1-S5. When one of the switches is closed, it couples a control voltage to a common node 58 for application of that voltage to an astable multivibrator 60. The multivibrator generates at an output terminal 62 pulses whose period is directly proportional to the value of the control voltage at node 58. The latter pulses are those shown in FIGS. 2 and 3, and they are coupled back to the counter 56 as clock pulses. The reset input of the counter 56 may receive a 60 hertz signal so that the encoder's repetition is 60 cycles per second.

Figure 5:
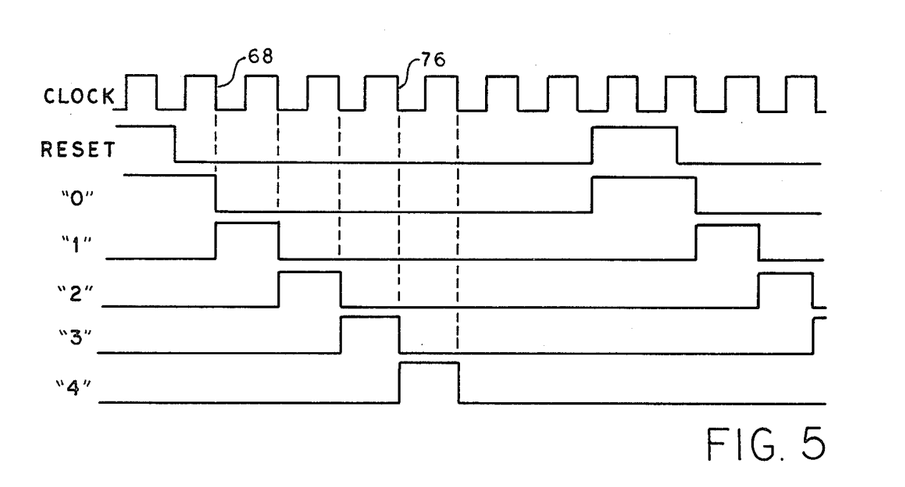
FIG. 5 depicts various waveforms useful in explaining the operation of the encoder shown in FIG. 4.

In operation, the counter 56 develops a high level signal at its "0" output and low level signals at outputs "1" through "4" when the reset signal is high (see FIG. 5). The high level signal at the counter's "0" output actuates the switch S1 so that it contacts the junction between a pair of resistors 64 and 66. Consequently, a control voltage of a fixed value is applied to the multivibrator 60 and the latter device develops at terminal 62 a start pulse whose period is fixed.

When the reset signal goes low and when the next successive negative-going transition 68 occurs in the clock pulse, the counter's "0" output goes low and its "1" output goes high. Consequently, the switch S1 is deactivated and the switch S2 is closed for contacting the wiper arm of a variable resistor 70. The latter resistor is a user-operable control whose wiper arm may be adjusted to vary the pulse period associated with channel 1 so as to vary the hue, for example, of the images developed by the monitors. The selected voltage at the wiper arm of the resistor 70 is coupled by the switch S2 to the node 58. In response, the multivibrator 60 develops at terminal 62 a pulse whose period is determined by the value of the voltage received from node 58.

As shown in FIG. 5, the counter 56 continues generating successive high level signals at its outputs "2" and "3" in response to the clock inputs. Consequently, switches S3 and S4 are successively actuated for applying user-selected voltages from variable resistors 72 and 74 to the node 58. As discussed above, the multivibrator 60 responds to those voltages by generating a pair of successive output pulses whose periods are determined by the settings of the resistors 72 and 74.

When the next negative-going transistion of the clock signal occurs, the counter's output "4" goes high to activate the switch S5. In this case, the latter switch couples the operating voltage (V+) to the input of the multivibrator, the latter of which then develops an output pulse of an infinite period. Consequently, the counter 56 is not clocked again and "hangs" until reset by the next 60 hertz signal, after which the operation described above repeats again. Thus, a repetitive train of control pulses is developed at terminal 62 for transmission to the decoders. Each pulse (other than the start pulse) has a pulse period which is user-controlled for adjusting one of the control functions of the monitors.

Figure 6:
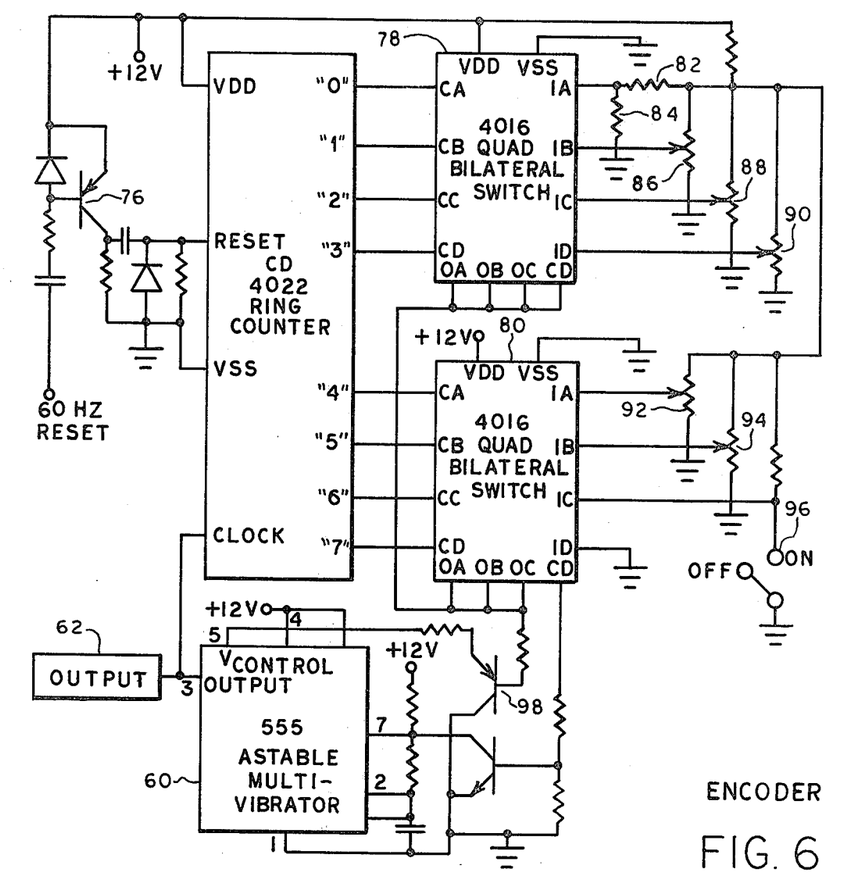
FIG. 6 is a detailed circuit diagram illustrating how the encoder of FIG. 4 may be constructed.

Referring now to FIG. 6, a detailed circuit diagram is shown for implementing the structure shown in FIG. 4. The illustrated circuitry includes commercial identifying numbers and pin input/output designations where appropriate. Briefly, a 60 hertz reset signal is coupled via a transistor 76 and its associated circuitry to the reset input of the ring counter which, as shown, may be adapted to develop a 6 channel output rather than the three channel output shown in FIG. 4. The outputs "0" through "7" of the ring counter are coupled to a pair of bilateral switches 78 and 80 which sense the start pulse voltage at the junction of resistors 82 and 84, the voltages at the wiper arms of variable resistors 86-94, and an on/off signal at terminal 96. The voltages thus sensed are successively coupled by the switches 78 and 80 to the control input of the multivibrator 60 via a transistor 98. The multivibrator generates its output pulses at the terminal 62, which pulses are also coupled to the clock input of the ring counter. In this manner, the encoder generates pulses similar to those shown in FIGS. 2 and 3.

Figure 7:
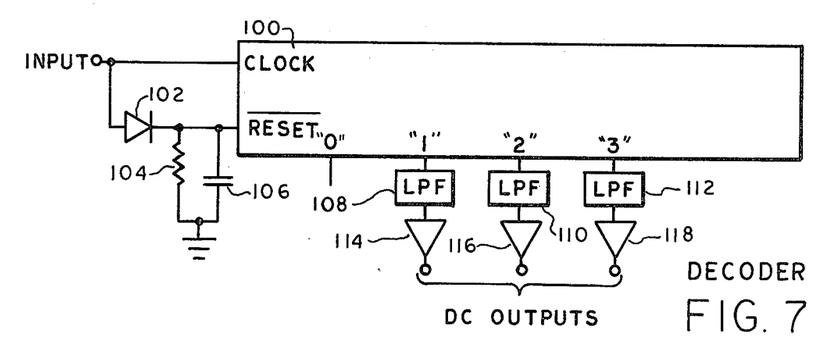
FIG. 7 is a diagram of one embodiment of the decoder shown in FIG. 1.

A three channel decoder for use with the system of FIG. 1 is shown in FIG. 7. In this embodiment, the decoder includes a ring counter 100 whose clock input is the train of pulses developed at terminal 62 in FIG. 4. A $\overline{\text{reset}}$ input for the counter 100 is developed by coupling the input pulses through a circuit comprising a diode 102, a grounded resistor 104, and a grounded capacitor 106. Output channels "1", "2" and "3" of the counter 100 are coupled to low pass filters 108, 110 and 112 which feed D.C. signals to amplifiers 114, 116 and 118. The amplified D.C. outputs of the latter amplifiers constitute D.C. control signals which are used to individually adjust the hue, contrast, etc. of the monitors.

In operation, a start pulse 120 (FIG. 8) which is received at the counter's input charges the capacitor 106 to a high level for holding the $\overline{\text{reset}}$ input high. The receipt of control pulses 122, 124 and 126 causes the charge on the capacitor 106 to remain high until the dead time interval occurs, whereupon the capacitor 106 discharges to allow the counter 100 to reset.

After the counter's reset input was driven high, the negative-going transition associated with the start pulse 120 clocks the counter so that the unused "0" channel output goes low and the channel "1" output (pulse 128) goes high and remains high until the negative-going transition associated with the control pulse 122 occurs.

Figure 8:
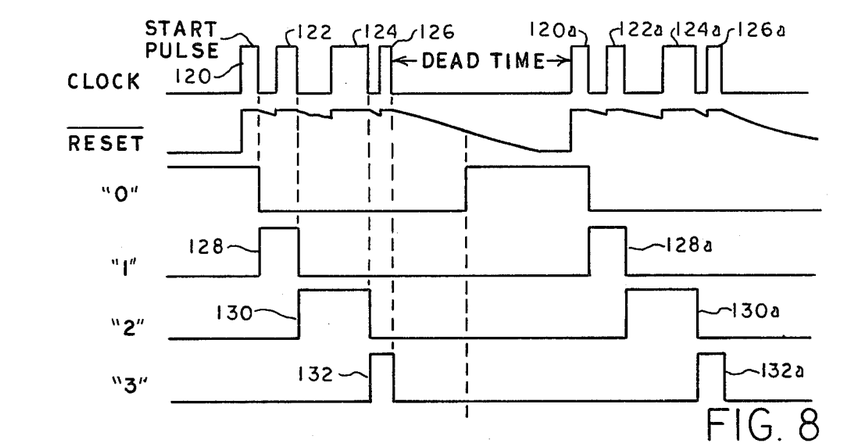
FIG. 8 depicts various waveforms useful in explaining the operation of the decoder shown in FIG. 7.

When the channel "1" pulse 128 goes low, the channel "2" output goes high as indicated by pulse 130 and stays high until the counter 100 is clocked again by the negative-going transition of control pulse 124. At that time, the channel "2" output goes low and the channel "3" output goes high as indicated by the pulse 132. The latter pulse terminates when the negative-going transition of the control pulse 126 occurs. Thereafter, the counter 100 is reset at time $t_1$ by the decayed charge on the capacitor 106. The cycle repeats again when the next cycle of pulses 102a–126a occurs so that another set of output pulses 128a–132a are developed by the counter 100.

Because the train of pulses 120–126 repeats continuously at a constant rate (60 hertz in the present example), the output pulses 128–132 and 128a–132a (and successive output pulses) may be integrated to derive D.C. voltages whose amplitudes vary as a function of the pulse periods associated with the control pulses. For example, if the pulse period of the control pulse 122 is increased, the duration of the output pulse 128 also increases. Consequently, the low pass filter 108 (FIG. 7) develops a larger D.C. voltage at its output so that a D.C. responsive control in each of the monitors may be adjusted accordingly.

Figure 9:
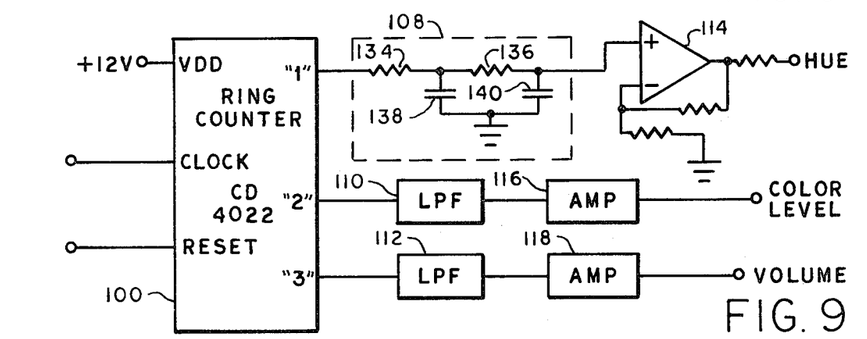
FIG. 9 illustrates the details of low pass filters and the amplifiers depicted in FIG. 7.

Referring now to FIG. 9, the output circuitry for the ring counter of FIG. 7 is shown in more detail. As illustrated, the ring counter 100 may be of the same type as used in the encoder. The low pass filter 108 coupled to the counter's channel "1" output may include resistors 134 and 136 and a pair of capacitors 138 and 140 interconnected as shown. The output of the filter 108 is an integrated voltage which is applied to the positive input terminal of the amplifier 114. The D.C. output of the amplifier 114 may be employed to adjust D.C. responsive hue controls (or other types of controls) in all the monitors.

The low pass filters 110 and 112, as well as the amplifiers 116 and 118 may be identical to the filter 108 and the amplifier 114. As shown, the D.C. outputs of the amplifiers 116 and 118 may be employed to adjust the color level and volume, respectively, of the monitors.

Referring to FIG. 1 again, a transmission path 38 is shown for coupling the multi-channel signal from the encoder 36 to the decoders 18a and 20a. The transmission path 38 may be a twisted pair of wires which merely couple the start and control pulses from the encoder 36 to the decoders 18a and 20a. Circuitry for effecting such transmission in a twisted pair environment is described hereinafter.

Another method for coupling the multi-channel signal to the decoders 18a and 20a is by modulating the multi-channel signal on a super video carrier, and combining that carrier with the video from the sources 10–16. In this manner, the video signals from any one of the sources 10–16 as well as the modulated multi-channel signal may be coupled to the decoders 18a and 20a on a single coaxial cable. The latter method of transmitting the multi-channel signal to the decoders may be effected by transmitting the receiving circuitry which is shown in FIG. 10, to which reference is now made.

Figure 10:
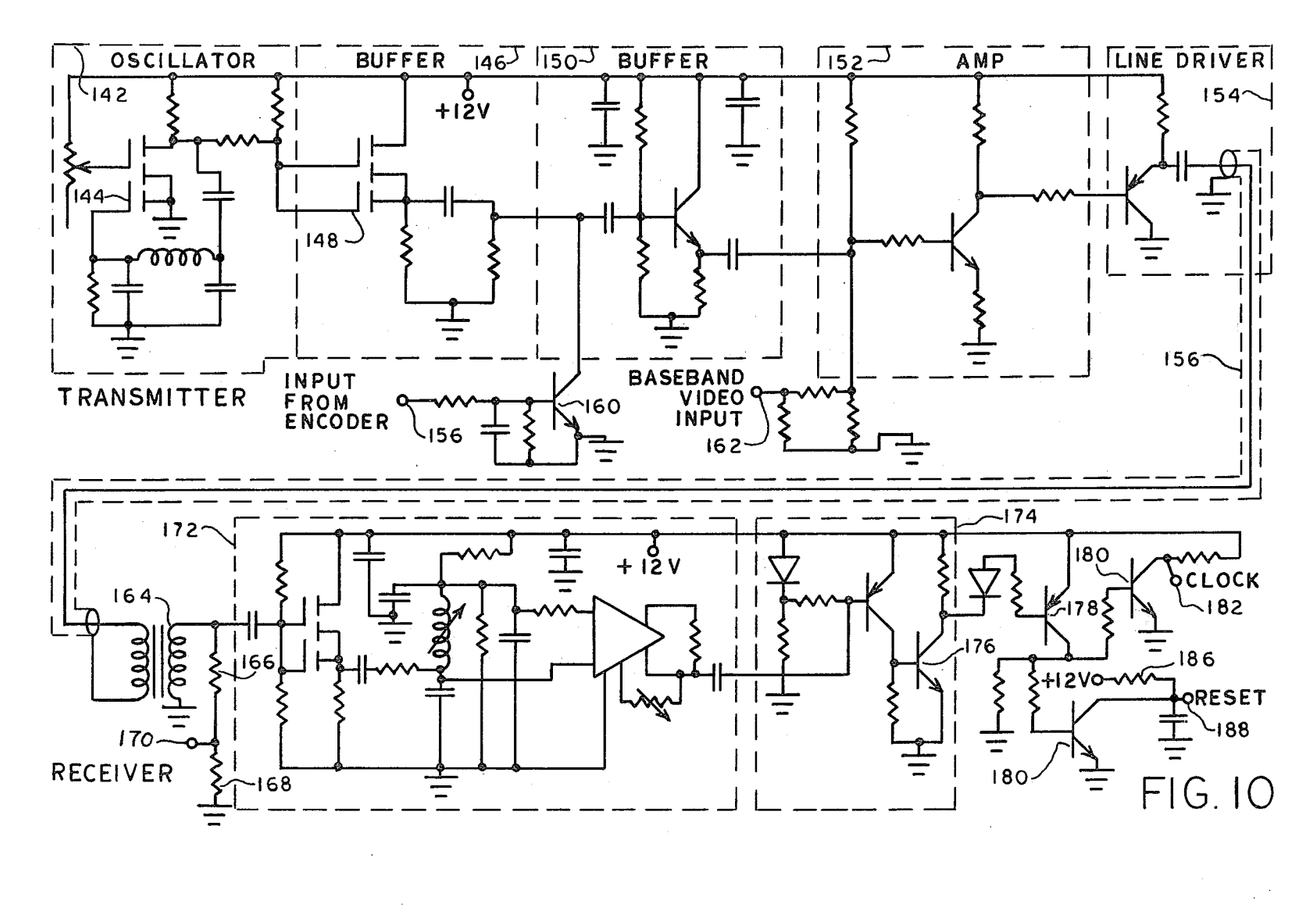
FIG. 10 illustrates a system for transmitting the encoder's multi-channel signal and the video from the video sources of FIG. 1 to the decoders and monitors on a super video carrier.

As shown in FIG. 10, the transmitting portion of the illustrated circuitry may include an oscillator 142 which includes a transistor 144 and its associated circuitry for developing an oscillator signal of 8.5 megahertz. The output of the oscillator may be coupled to a buffer 146 which includes another transistor 148 and its associated coupling and biasing circuitry. The output of the buffer 146 is coupled to another buffer 150 and from there to an amplifier 152 and a line driver 154 for driving a coaxial cable 156 with the 8.5 megahertz oscillator signal.

The oscillator signal on the cable 156 is modulated with the multi-channel signal which may be drived from the output terminal 62 of the encoder shown in FIGS. 4 and 6. The latter output terminal may be coupled to an input terminal 158 in the transmitting section of the circuitry shown in FIG. 10. The terminal 158 is coupled to an input circuit which includes a transistor 160 whose collector lead is coupled to the buffer 150. In this embodiment, the transistor 160 operates as an RF switch for modulating the 8.5 megahertz oscillator signal with the pulses which are developed by the encoder.

Video signals from a selected one of the sources 10–16 of FIG. 1 may be coupled to another input terminal 162 which couples to the amplifier 152. In this manner, the video signals and the multi-channel control signal modulate the oscillator signal which is carried by the cable 156 to the input of the receiving portion of the circuitry.

The receiving end of the cable 156 is coupled to the primary of a transformer 164, the secondary of which is coupled via a voltage divider comprising resistors 166 and 168 to an output lead 170. The signal on the lead 170 may be coupled to video processing circuitry inside the monitors for developing a video image in the usual manner.

The remaining circuitry associated with the receiver is used to convert the modulated 8.5 megahertz modulated oscillator signal to base band pulses for input to the decoders 18a and 20a of FIG. 1.

More specifically, the secondary of the transformer 164 is coupled to the input of an amplifier 172 which includes frequency selective circuitry for tuning the amplifier to 8.5 megahertz. The output of the amplifier 172 is coupled to a detector 174 for generating base band pulses at the collector of a transistor 176. Those pulses are fed through a buffer comprising a transistor 178 and then to an amplifier comprising another transistor 180. The collector of the transistor 180 is coupled to an output lead 182 which carries the pulses associated with the multi-channel control signal, and the latter output lead may be coupled to the clock input of the decoder shown in FIG. 7. The collector of the transistor 178 is coupled to a network which includes another transistor 184, a resistor 186 and a capacitor 188. The latter network provides the function of the diode 102, resistor 104 and the capacitor 106 which are shown in FIG. 7. Hence, the collector of the transistor 184 may be coupled directly to the reset input of the ring counter 100 of FIG. 7. With this arrangement, the video signals from a selected video source as well as the multi-channel signal may be coupled to one or more decoders on a single coaxial cable.

Figure 11:
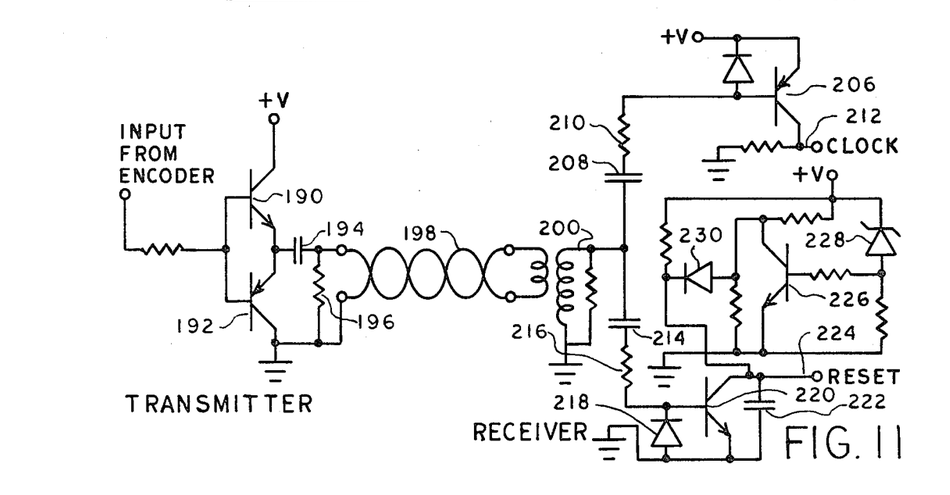
FIG. 11 shows a system for transmitting the encoder's multi-channel signal to a decoder via a twisted pair of wires.

Referring now to FIG. 11, another transmitting-/receiving circuit is shown whereby the multi-channel signal developed by the encoder may be transmitted to the decoders by a twisted pair of wires. In the illustrated embodiment, the transmitter includes a pair of transistors 190 and 192 whose input is the multi-channel signal developed at the output terminal 62 of the encoder shown in FIG. 4 or 6. The latter transistors drive a capacitor 194 and a resistor 196 which are coupled as shown to a twisted pair of wires 198. The latter wires are coupled to an input transformer 200, the secondary of which is coupled to a path 202 in which clock pulses are recovered and to another path 204 in which the reset signal is generated. More specifically, the path 202 couples the multi-channel signal from the transformer 200 to a transistor 206 via a capacitor 208 and a resistor 210. Negative going spikes carried by the path 202 switch the transistor 206 on to provide the clock pulses at an output terminal 212. The latter terminal may be coupled directly to the clock input of the ring counter which forms part of the decoder in FIG. 7.

The path 204 is coupled via a capacitor 214 and to a resistor 216 to the cathode of a grounded diode 218 and to the base of the transistor 220. The collector of the transistor 220 is coupled to a grounded capacitor 222 and to an output lead 224, the latter of which carries a reset output which may be coupled directly to the reset input of the counter 100 shown in FIG. 7. Positive going spikes received via the path 204 switch the transistor 220 on to provide the reset waveform.

A protection circuit comprising a transistor 226, a zener diode 228, a diode 230 and the associated resistors shown in FIG. 11 may be coupled to the collector of the transistor 220 as shown. With this arrangement, the protection circuit holds the reset output lead 224 high until the supply voltage (V+) has reached a sufficiently high level, at which time the transistor 226 turns on and reverse biases the diode 230, thereby allowing the reset function to operate. This arrangement eliminates any turn-on transient problem which may occur during power-up.

Figure 12:
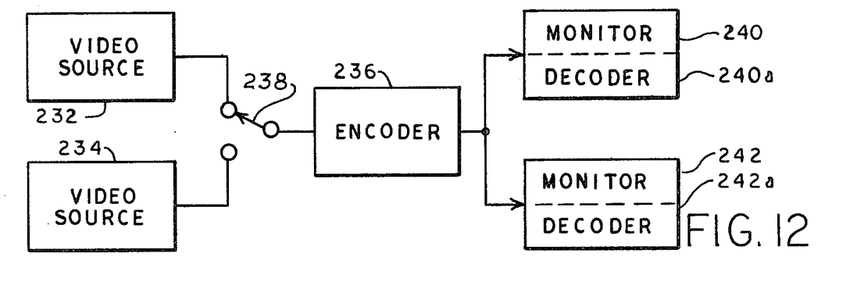
FIG. 12 is a simplified block diagram of another system according to the invention for remotely adjusting a monitor's control functions by a multichannel control signal inserted into the vertical interval of the video which is supplied to the monitor.

As thus far described, the encoder generates a multi-channel signal whose information content is in the variable periods of the control pulses, and those control pulses have been transmitted to one or more decoders either by a twisted pair of wires or by a coaxial cable. In an alternate embodiment which is described immediately below, an encoder generates a multi-channel signal whose information content resides in the pulse width rather than the pulse period of control pulses, and in which the multi-channel signal is inserted into the vertical interval of the video signal which originates from the selected video source. Referring now to FIG. 12, a simplified block diagram is shown of the arrangement in which the latter encoding scheme may be employed.

As shown, a plurality of video sources, shown here as a pair of sources 232 and 234, may be selectively coupled to an encoder 236 by a switch 238. The encoder 236 operates to generate a multi-channel signal comprising control pulses whose width may be varied by a user, and it inserts those control pulses into the vertical interval of the video signal generated by the video source which is selected by the switch 238. The video signal which contains the multi-channel control signal is then coupled to one or more remote monitors 240 and 242 which include associated decoders 240a and 242a.

Figure 13:
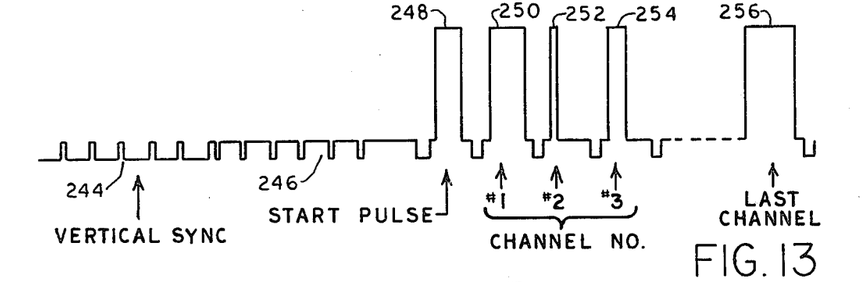
FIG. 13 illustrates the way in which a video signal is caused to carry the multi-channel control signal in its vertical interval.

Referring now to FIG. 13, there is shown the way in which the control pulses in the multi-channel control signal are inserted into the video signal supplied by one of the sources 232 or 234. As shown, the video signal which is received by the encoder 236 includes a vertical sync pulse 244 which may be followed by the customary equalizing pulses 246. After termination of the equalizing pulses (if any), a start pulse 248 lasting about 20 microseconds is inserted into the video signal by the encoder 236. The start pulse 248 and the succeeding pulses go to approximately 200 percent white for purposes of noise immunity. After the start pulse, control pulses 250-256 for each control channel are inserted during succeeding horizontal line intervals, one control pulse per channel and line interval until the last channel is transmitted. The widths of the control pulses 250-252 are varied by user-controlled knobs associated with the encoder 236 for adjusting the control functions associated with the monitors 240 and 242. In this case, of course, the decoders 240a and 242a are adapted to sense the change in width of the control pulses for adjusting the control functions associated with the monitors.

Figure 14:
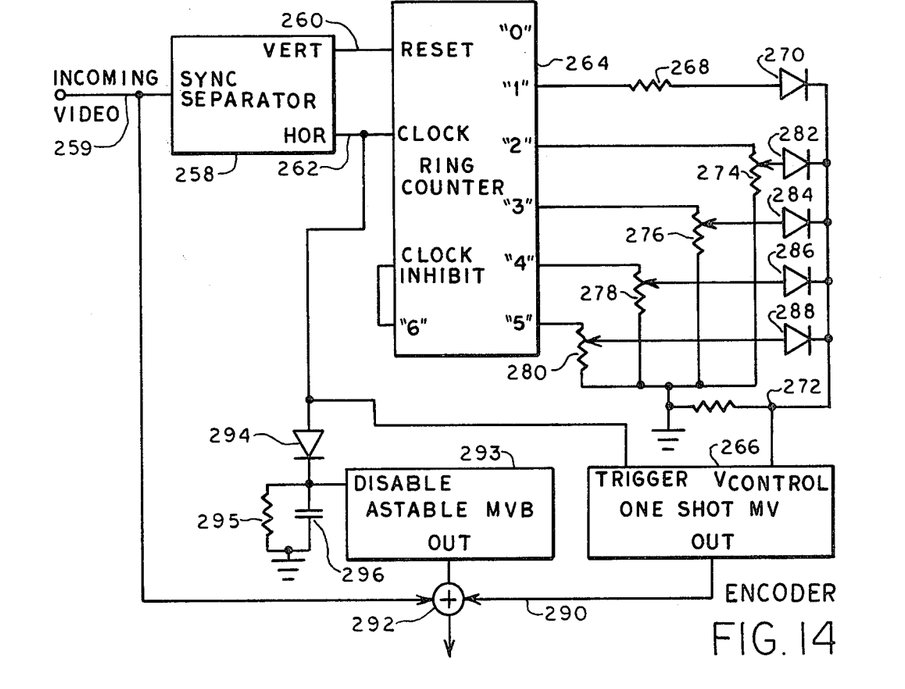
FIG. 14 depicts the encoder of FIG. 12 in more detail.

Referring now to FIG. 14, a block diagram is shown of an embodiment of the encoder 236 of FIG. 12. In this embodiment, the encoder includes a sync separator 258 which receives incoming video via an input lead 259 from either of the sources 232 or 234 shown in FIG. 12. This video, of course, includes vertical sync pulses and horizontal rate pulses, which pulses are separated by the sync separator 258 such that the vertical sync pulses are applied to an output lead 260 and horizontal rate pulses are applied to another output lead 262. The lead 260 is coupled to the reset input of a ring counter 264 of the type previously described. The lead 262 carries the horizontal rate pulses to the clock input of the counter 264 and to the trigger input of a one shot multivibrator 266.

The ring counter 264 is adapted to generate four control pulses and a start pulse so that this particular encoder is a four channel decoder. The output indicated at "1" of the counter 264 is coupled via a fixed resistor 268 and a diode 270 to a common node 272, the latter being coupled to the voltage control input of the multivibrator 266. Channels "2"–"5" are coupled to user-operable variable resistors 274≧280, the wiper arms of which are coupled to the node 272 via diodes 282-288.

In operation, the vertical pulse from the sync separator 258 resets the counter 264, thereby causing its "0" output to go high. When clocked by the next horizontal rate pulse, the ring counter causes its "1" output to go high so as to feed a fixed voltage via the resistor 268 and the diode 270 to the multivibrator 266. The multivibrator 266 generates an output pulse whose period is controlled by the value of the voltage at the node 272, which at this time is selected to cause a start pulse of about 20 microseconds to be developed at the output terminal of the multivibrator 266. That output pulse is coupled via a lead 290 to a summer 292 which also receives the incoming video from the input lead 259. The output of the summer 292 includes the input video as well as the pulses generated by the multivibrator 266, and this combined signal constitutes the output of the encoder 236 shown in FIG. 12.

When the next successive horizontal pulse clocks the counter 264, the output labeled "2" of the counter 264 goes high, and the wiper arm of the resistor 274 couples a portion of that high level signal to the node 272 via the diode 282. Consequently, multivibrator 266 generates a control pulse whose width is determined by the value of the voltage at 272, and this latter pulse constitutes the channel one pulse shown in FIG. 13.

As succeeding horizontal rate pulses clock the ring counter 264, its outputs "3"–"5" go high sequentially, thereby to apply user-selected voltages to the node 272 so that the multivibrator 266 generates control pulses for channels two, three and four. On the next successive horizontal rate pulse, the "6" output of the counter goes high and, since this latter output is coupled to the clock inhibit input of the counter 264, the counter will be inhibited and "hang up" until reset again by the next vertical sync pulse. When the counter hangs up, the control voltage at the node 272 will be zero and the multivibrator will generate no output so as not to disturb the video signals which occur subsequent to this last horizontal rate pulse.

In some applications, the monitors may be turned off by the absence of a video signal, If, however, it is desired to maintain the monitors in an on condition in the absence of a video signal, some replacement signal must be introduced at the output of the summer 292. In the illustrated embodiment, this is accomplished by an astable multivibrator 293 and its input circuitry comprising a diode 294, a resistor 295, and a capacitor 296. As shown, the diode 294 receives horizontal rate pulses from the separator 258. When such pulses are present, the diode 294 charges the capacitor 296, the voltage on which is coupled to the disable input of the multivibrator 293. Hence, whenever horizontal rate pulses are present, the multivibrator 293 is turned off. Whenever the incoming video at terminal 259 terminates, the diode 294 receives no horizontal rate pulses and the capacitor 296 discharges so that the multivibrator 293 is enabled and thereby generates output pulses for application to the summer 292. Those output pulses are coupled by the summer 292 to the input to the monitors so that the latter are enabled even though incoming video is no longer being received at the input lead 259.

Figure 15:
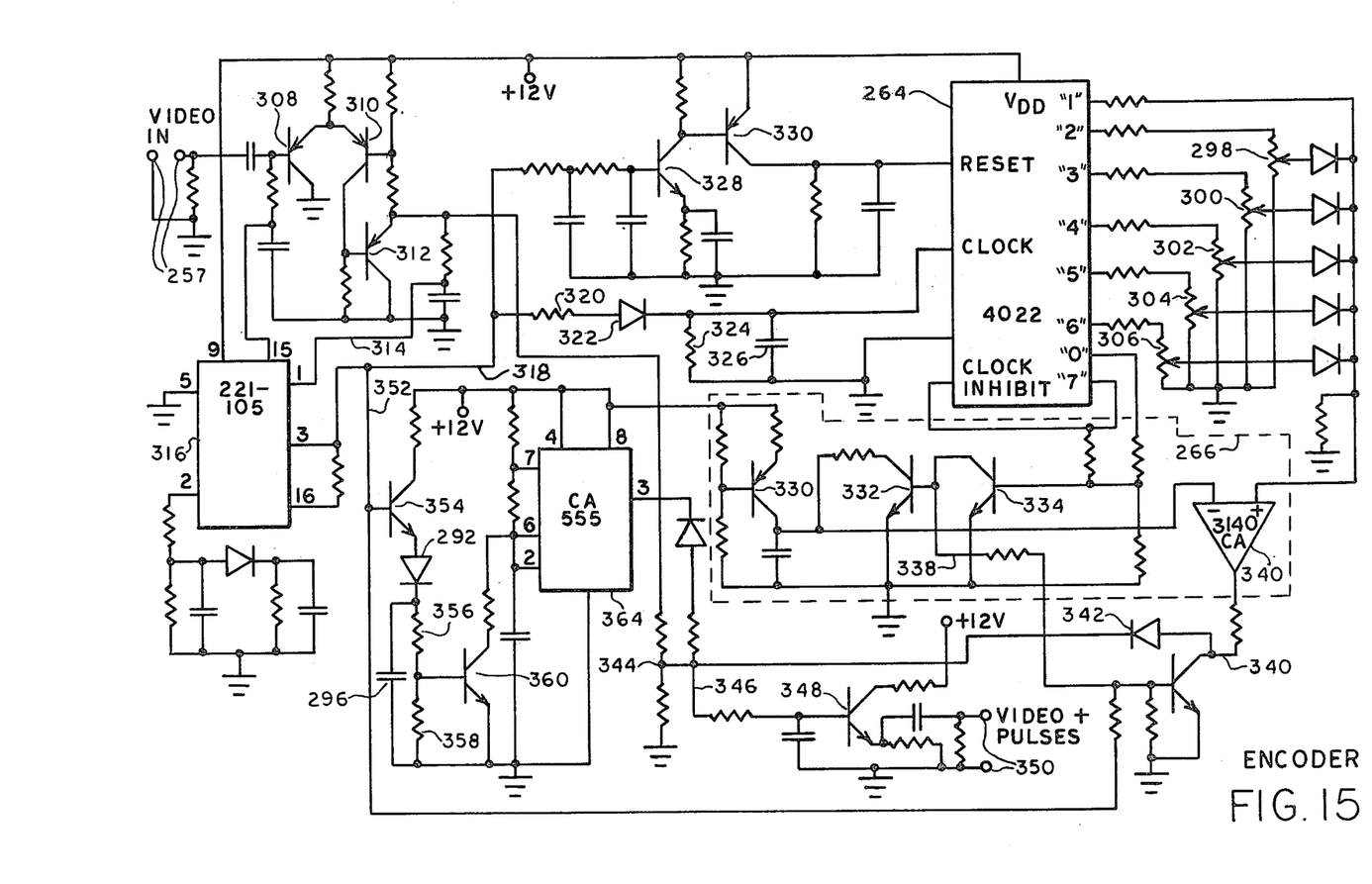
FIG. 15 is a detailed circuit diagram of the encoder shown in FIG. 14.

A detailed schematic diagram of an encoder of the type shown in FIG. 14 is depicted in FIG. 15, to which reference is now made. In this embodiment, the encoder includes a ring counter 264 which has outputs which are identified as "0"–"7", the latter output being coupled to the clock inhibit input of the counter 264. The output from the counter's channel "1" develops the start pulse and outputs "2"–"6" are coupled to variable resistors 298-306, the wiper arms of which are coupled via the illustrated diodes to the common node 272 for application to the voltage control input of the one shot multivibrator 266. As discussed with reference to the figures described above, the variable resistors 298-306 are all user-operable devices for adjusting the widths of the pulses produced by the multivibrator 266 so as to adjust the control functions associated with the monitors.

The input to the decoder is shown at the upper left of FIG. 15 at which terminal 259 receives a video input from the selected video signal source. That video input is coupled to an amplifier comprising transistors 308, 310 and 312 and their associated circuitry. The output of the latter amplifier is coupled via a lead 314 to the input of a horizontal sync separator 316. The output of the separator 316 includes horizontal and vertical sync pulses at the separator's output lead 318. Those pulses are coupled to a noise filter which includes a resistor 320 in series with a diode 322 and the parallel combination of another resistor 324 and a capacitor 326. As shown, the filtered horizontal pulses are applied to the clock input of counter 264.

The sync pulses on lead 318 are also coupled to a vertical sync separator which includes transistors 328 and 330 and their associated circuitry. With this arrangement vertical sync pulses are applied via the collector of transistor 330 to the reset input of the counter 264.

Referring to the multivibrator 266, it includes transistors 330, 332 and 334 interconnected as shown with an amplifier 340. The base of the transistor 332 receives sync pulses via a lead 338 which is coupled to the output lead 318 from the horizontal sync separator 316. Hence, the sync pulses appearing on the lead 338 constitute the trigger input to the multivibrator 266. The other input to this multivibrator is, of course, the signals which are generated by the counter 264 and applied to the input of the multivibrator at the node 272.

The control pulses which are generated by the multivibrator 266 are coupled via a lead 341 and a diode 342 to a summing node 344 at which video is also received via the input identified as C1. The latter video is coupled from a correspondingly identified output of the transistor 312 which forms part of the input amplifier. Hence, control pulses and video are summed at the node 344 and that summed signal is coupled via a lead 346 to the input of a line driver which includes a transistor 348, the emitter of which is coupled to output terminals 350. The combination of the video and pulses present at the terminals 350 may be coupled via a coaxial cable to remote monitors and their associated decoders.

As stated above with reference to FIG. 14, the encoder preferably develops replacement sync pulses to maintain the monitors in an on condition when video is not received at the input terminals 259. For this purpose, the sync pulses on the lead 318 are coupled via another lead 352 to the base of a transistor 354, the emitter of which is coupled via the diode 292 to the parallel combination of the capacitor 296 and a pair of resistors 356 and 358. The combination of the transistor 354, the diode 292, the capacitor 296 and the resistors 356 and 358 operate as a peak detector for sensing the presence of horizontal sync pulses. The junction between the resistors 356 and 358 is coupled to the base of another transistor 360 whose collector is coupled to the disable input of an astable multivibrator 364. Thus, when sync pulses are sensed, the multivibrator 364 is disabled. However, when sync pulses are not sensed, the transistor 360 is turned off for enabling the multivibrator 364, the latter of which then generates output pulses which are coupled to the summing terminal 344 via a diode 364. With this arrangement, replacement sync pulses are coupled from the node 344, through the line driver, and thence to the remote monitors to maintain those monitors in an on condition when no video is present at input terminals 259.

Referring again briefly to the decoder 264, it will be noted that the outputs labeled "0" and "7" are both coupled to the base of the transistor 334 in the multivibrator 266. This connection inhibits the output of the multivibrator 266 during the transmission of normal video, i.e., other than during the vertical interval when the control pulses are being generated by the multivibrator.

Figure 16:
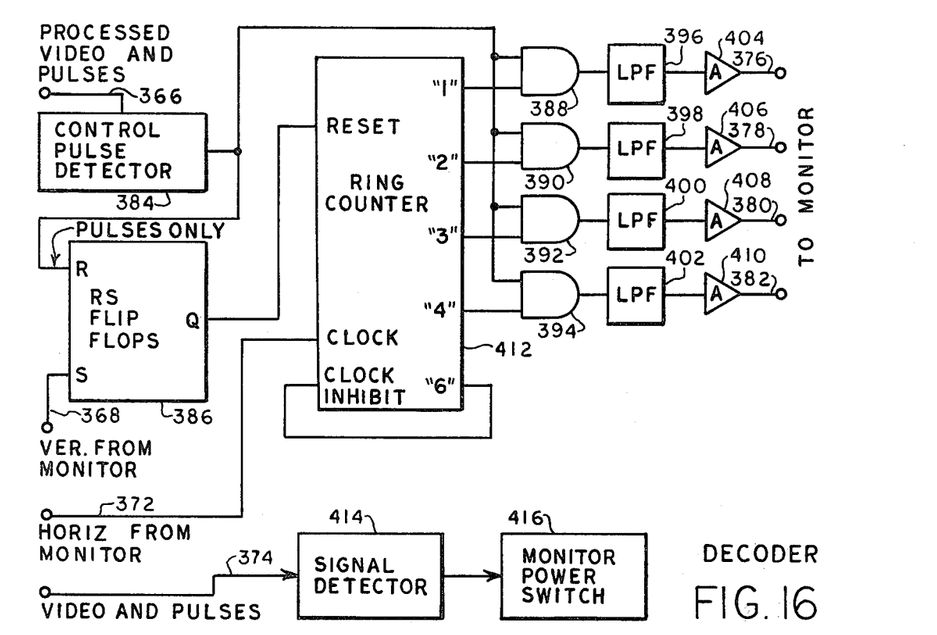
FIG. 16 is a block diagram of the decoder shown in FIG. 12.

Referring now to FIG. 16, a block diagram is shown of a decoder of the type which may be used with the system of FIG. 13. The present decoder is illustrated as a four channel device for generating four D.C. control signals at output leads 376, 378, 380 and 382 for adjusting the control functions associated with its monitor.

In this embodiment, the decoder includes a first input terminal 366 which receives from the monitor both video and control pulses which may have been processed by automatic gain control stages and other video processing stages which are conventionally included in video monitors. A second input lead 368 receives vertical blanking pulses from the monitor to effect a reset function of the encoder. A third input lead 372 receives horizontal rate pulses which may be derived from the horizontal flyback associated with the monitor. These latter pulses are used to clock the encoder. A fourth input lead 374 also receives video signals from the monitor and these latter signals are coupled from the monitor such that they are always present, irrespective of whether the monitor itself is off or on. As is described hereinafter, the signals on the lead 374 are detected and employed to turn the monitor on in a case where it had been previously off.

Figure 17:
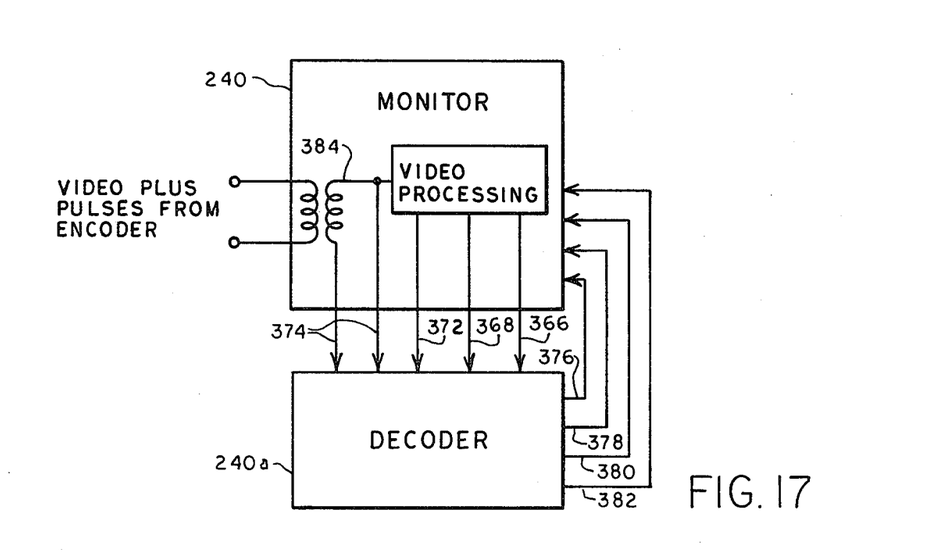
FIG. 17 shows how the decoder of FIG. 16 may be interfaced with its associated monitor.

To illustrate more clearly how the decoder of FIG. 16 may interface with its monitor, reference is briefly made to FIG. 17. The latter Figure illustrates the monitor 240 and its associated decoder 240a of the type which are also shown in FIG. 12. In the illustrated embodiment, the monitor 240 receives video plus control pulses from the encoder, all of which may be coupled to the monitor via a transformer 384. The secondary of the transformer 384 is coupled to the input of conventional video processing circuitry which may include automatic gain control stages and the like. The secondary of the transformer 384 is also coupled via leads 374 to the decoder 240a so as to couple the video and the control pulses to the decoder even when the monitor itself may be in an off condition.

As shown, the video processor includes an output lead 366 for coupling processed video and control pulses to the decoder, a lead 368 for coupling vertical blanking pulses to the decoder, and a lead 372 for coupling horizontal rate pulses to the decoder, the latter pulses being derived, for example, from the horizontal flyback associated with the monitor. As described in more detail below, the decoder 240a processes the control pulses received by the monitor for developing four channels of D.C. output signals at the leads 376-382 for adjusting the control functions associated with the monitor 240.

Referring again to FIG. 16, the decoder shown therein includes a control pulse detector 384 which receives the processed video and control pulses from the monitor via lead 366. The function of the detector 384 is to detect and clip the control pulses so that their amplitude is reduced to that of the video signal and to couple the clipped control pulses to the reset input of an RS flip-flop 386. The control pulses are also coupled from the output of the detector 384 to one input of each of four AND gates 388, 390, 392 and 394. The outputs of the AND gates are coupled to low pass filters 396, 398, 400 and 402 and thence to amplifiers 404-410.

Referring again to the flip-flop 386, its set input (S) receives a vertical blanking pulse from the monitor via the lead 368, and its output is coupled to the reset input of a ring counter 412. The counter's outputs identified as "1" through "4" are all coupled to the other inputs of the AND gates 388-394. The output of the counter identified as "6" is coupled to the counter's clock inhibit input.

In operation, the leading edge of the vertical blanking signal which is received at the lead 368 sets the flip-flop 386, the output of which then goes high to reset the counter 412. The next pulse output from the detector 384 resets the flip-flop 386 and allows the counter 412 to develop sequential high level pulses at its outputs "1"–"6" as it is clocked by the horizontal pulses received via lead 372. The counter 412 continues developing sequential output pulses until it hangs up as a result of its output indicated to "6" going high to inhibit the counter 412.

When the counter 412 is enabled, it will continuously develop sequential high level outputs which are applied to the AND gates 388-394. However, the AND gates do not develop high level outputs until they receive control pulses from the detector 384. For example, when the gate 388 receives a control pulse from the detector 384 and a high level signal from output "1" of the counter 412, it develops a high level signal at its output for application to the low pass filter 396. The high level output of the gate 388 is a pulse whose width varies in accordance with the width of the control pulse received from the detector 384. The low pass filter 396 integrates the pulse received from the gate 388 and applies that integrated signal to the amplifier 404 for developing an amplified D.C. control signal at the output lead 376.

The AND gates 390, 392 and 394 operate in a similar manner such that additional D.C. control signals are developed at output leads 378, 380 and 382.

As discussed above, the decoder may also include means for turning the monitor on whenever video and pulses are received at the lead 374. For this purpose, a signal detector 414 receives the video and control pulses from the lead 374, senses their presence, and actuates a monitor power switch 416 to turn the monitor on automatically.

In constructing the decoder shown in FIG. 16, the ring counter 412 may be of the same type as previously described. In addition, the low pass filters 296-402 may be of the same construction as shown for the low pass filter 108 of FIG. 9. The amplifiers 404-410 may, of course, be conventional. The control pulse detector 384, the flip-flop 386 and the signal detector 414 may be of the preferred construction which is shown in FIG. 18.

Figure 18:
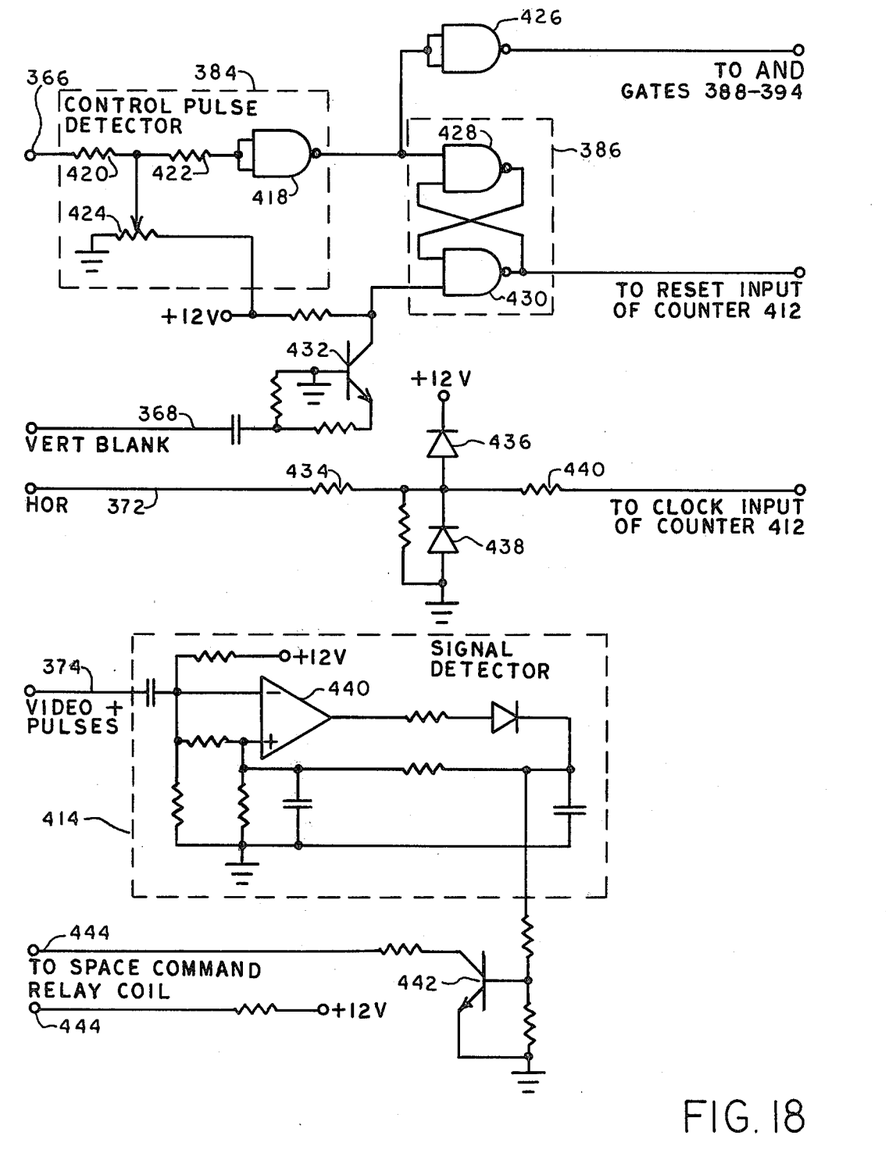
FIG. 18 is a more detailed circuit diagram of portions of the decoder shown in FIG. 16.

As shown in FIG. 18, the control pulse detector 384 couples the processed video and control pulses from the input lead 366 to a gate 418 via a pair of serially connected resistors 420 and 422. The junction between the resistors 420 and 422 is coupled to the wiper arm of a variable resistor 424 in order to set the point at which the detector 284 clips the control pulses. The output of the gate 418 may be coupled as shown to an inverter 426, the output of which is coupled to one input of each of the AND gates 388-394 as shown in FIG. 16.

The flip-flop 386 includes a pair of NAND gates 428, 430 which are interconnected as shown to form a flip-flop. An input to the flip-flop 386 is received from the collector of a transistor 432, the emitter of which receives a vertical blanking pulse via the lead 368. The leading edge of the latter pulse occurs at the beginning of the vertical interval for effecting reset of the counter 412 at that time.

The lead 372 receives a horizontal flyback pulse which is coupled via a resistor 434 to the junction of a pair of diodes 436 and 438. The cathode of the diode 436 is coupled to a 12 volt supply source and the anode of the diode 438 is grounded. Their junction is coupled through another resistor 440 to the clock input of the counter 412.

The signal detector 414 includes an amplifier 440 whose inverting input is coupled to the lead 374 to receive video and pulse signals from the secondary of the transformer 384 which is shown in FIG. 17. The noninverting input of the amplifier 44 is coupled as shown to the illustrated resistance/capacitance network, and the output of the amplifier 440 is coupled to the base of the transistor 442. When the signal detector senses the presence of signals on the lead 374, the transistor 442 is turned on for supplying an operating potential across output leads 444, the latter of which may be coupled to a so-called "space command" relay coil in the monitor for turning the monitor on when the transistor 442 is conductive. In the absence of a signal on the lead 374, the transistor 442 is turned off, thereby removing the operating potential between the output lead 444.

It will be appreciated that the systems described above provide for easy and relatively inexpensive adjustment of the control functions associated with remotely located television monitors. The system is particularly advantageous for use with so-called modular television systems in which a television set is made up of modular components which include a signal receiving module and a display module. For example, the television receiver 10 of FIG. 1 may be a signal receiving module and the monitor 18 may be the receiver's remote display module.

Although the invention has been described in terms of preferred structure, it will be obvious to those skilled in the art that many modifications and alterations thereto may be made without departing from the invention. Accordingly, all such modifications and alterations are deemed to be within the spirit and scope of the invention as defined by the appended claims.

What is claimed is:

1. A system for remotely adjusting the control functions of at least one television monitor, comprising:
    an encoder for generating a repetitive multi-channel signal whose period is substantially constant, each channel including a control pulse having a variable pulse period, said encoder including:
        user-operable controls which are adapted to generate a plurality of user-variable control signals, a counter for generating sequentially occurring output pulses,
        switch means responsive to said output pulses for sequentially selecting the control signals, and means responsive to each selected signal for generating a control pulse whose period is a function of the value of the selected control signal;
    a transmission path for coupling the multi-channel signal to a decoder; and
    a decoder associated with the monitor and receiving the multi-channel signal for converting each of said control pulses to an output signal whose value is a function of said pulse period so as to develop a multi-channel output signal for application to and adjustment of the monitor's control functions.

2. A system as set forth in claim 1 wherein said counter is a ring-type counter, and wherein said control pulse generating means includes an astable multivibrator.

3. A system for remotely adjusting the control functions of at least one television monitor, comprising:
    an encoder including user-operable controls for generating a repetitive multi-channel signal whose period is substantially constant, each channel including a control pulse having a pulse period which is variable by the user-operated controls;
    a transmission path for coupling the multi-channel signal to a decoder; and
    a decoder associated with the monitor and receiving the multi-channel signal for converting each of said control pulses to an output signal whose value is a function of said pulse periods so as to develop a multi-channel output signal for application to and adjustment of the monitor's control functions, said decoder including a counter having a clock input, a reset input, and outputs corresponding to each channel of the multi-channel system, means for coupling the multi-channel signal to the counter's clock input, a peak detector receiving the multi-channel signal and coupling the peak-detected multi-channel signal to the counter's reset input, and means for integrating each output of the counter so as to develop a plurality of D.C. output signals for use in adjusting the monitor's control functions.

4. A system as set forth in claim 3 wherein said integrating means includes a plurality of low pass filters each receiving one of the counter's outputs.

5. A system for remotely adjusting the control functions of at least one television monitor, comprising:
    an encoder, including:
        a counter having a reset input, a clock input and a plurality of outputs for generating sequentially occurring output pulses within a constant but repetitive period;

means for periodically resetting the counter;

user-operable controls for generating a plurality of user-variable control signals;

means responsive to the counter's output pulses for sequentially selecting the user-variable control signals;

an astable multivibrator responsive to each selected control signal for generating a control pulse whose period is a function of the value of the selected control signal and means for coupling the control pulses from the multivibrator to the clock input of the counter;

a transmission path receiving the control pulses from the multivibrator for coupling them to a decoder; and a decoder associated with the monitor and receiving the control pulses from the transmission path for converting the control pulses to a corresponding number of D.C. output signals for use in adjusting the monitor's control functions.

6. A system for remotely adjusting the control functions of at least one television monitor, comprising:

an encoder adapted to receive a video signal from a selected video source, said encoder including:

user-operable controls for generating a repetitive multi-channel signal, each channel including a function control signal having a parameter which is variable by the user-operated controls, and means for inserting the multi-channel signal into the video signal's vertical interval and four coupling the resultant video signal to a transmission path;

a transmission path for coupling the resultant video signal to a decoder; and;

a decoder associated with the monitor and receiving the resultant video signal for retrieving the multi-channel signal therefrom and for converting each of said function control signals to an output signal whose value is a function of said variable parameter so as to develop a multi-channel output signal for application to and adjustment of the monitor's control functions.

7. A system as set forth in claim 6 wherein the video signal from the selected video source includes horizontal sync pulses, wherein the encoder is responsive to horizontal sync pulses occurring in the video signal's vertical interval for generating a plurality of control pulses, and wherein the encoder includes means for combining said control pulses with the video signal received from the selected video source.

8. A system as set forth in claim 7 wherein the video signal from the selected signal source includes vertical sync pulses, wherein the encoder includes a counter having a reset input adapted to receive the vertical sync pulses, a clock input adapted to receive the horizontal sync pulses, and a plurality of outputs at which the counter develops a plurality of sequential output pulses in response to receipt of a corresponding number of sequential horizontal sync pulses after it has been reset by a vertical sync pulse, the encoder further including means receiving the counter's output pulses for generating a corresponding number of control pulses whose widths are variable by said user-operable controls.

9. A system as set forth in claim 8 wherein said user-operable controls are adapted to generate user-variable control signals, and wherein said control pulse generating means includes a multivibrator adapted to generate a control pulse of a given width in response to the value of a control signal, and means for sequentially applying said control signals to the multivibrator in sequence with the generation of output pulses by the counter.

10. A system as set forth in claim 6 wherein the monitor is adapted to receive and to couple to the decoder the video signal combined with the control pulses, wherein the monitor is of the type which is conditioned to turn off when no sync pulses are received from the encoder, and wherein the encoder additionally includes means for generating and inserting replacement pulses into the encoder output in the absence of an input video signal to the decoder so as to maintain the monitor in an on condition.

11. A system as set forth in claim 10 wherein said replacement pulse generating means includes an astable multivibrator for generating replacement pulses, and a detector for sensing horizontal sync pulses present in the video signal received by the decoder and for disabling said astable multivibrator when such horizontal sync pulses are sensed.

12. A system as set forth in claim 6 wherein the decoder includes means for detecting the control pulses in the resultant video signal, counter means receiving horizontal rate pulses for generating a sequence of pulse outputs in response to the received horizontal pulses, and means receiving the sequential pulse outputs and the detected control pulses for developing D.C. output signals in response to substantially simultaneous receipt of the detected control pulses and the sequential pulse outputs, whereby the control functions of the monitor may be adjusted by said D.C. output signals.

13. A system as set forth in claim 12 wherein said means for developing D.C. output signals is responsive to the width of each detected control pulse so as to generate D.C. output signals whose values are a function of the width of the control pulses.

14. A system as set forth in claim 13 wherein said counter means includes a ring-type counter.

15. A system as set forth in claim 14 wherein said counter includes a reset input and a clock input, the reset input being adapted to receive a vertical blanking signal for resetting the counter, and the clock input being adapted to receive horizontal rate pulses so that the counter generates, after having been reset, a sequence of pulse outputs in response to sequential horizontal rate pulses.

16. A system as set forth in claim 13 wherein the decoder includes means responsive to an incoming video signal for automatically turning on the monitor.

17. A system as set forth in claim 13 wherein said means for developing D.C. output signals includes a plurality of gates, each gate having a pair of inputs for receiving a detected control pulse at one input thereof and one of the pulse outputs at the other input thereof so as to develop a high level output signal whose duration is a function of the width of a received control pulse.

18. A system as set forth in claim 17 wherein said means for developing D.C. output signals includes a plurality of integrators, each coupled to the output of one of said gates, for integrating the high level outputs of the gates.

19. A system as set forth in claim 6 wherein said decoder includes a detector receiving the resultant video signal for detecting the control pulses therein, a counter having a plurality of outputs and a clock input adapted to receive horizontal rate pulses so as to develop at its outputs a sequence of high level pulses in response to sequentially received horizontal rate pulses, a plurality of AND gates each receiving at one input thereof the detected control pulses from said detector and at the other input thereof the high level pulses from the counter, and means for integrating the output of each AND gate for developing a plurality of D.C. control voltages for adjusting the control functions of the monitor.

20. A system as set forth in claim 19 wherein the monitor includes means receiving the resultant video signal from the encoder and for coupling that signal to a further input of the decoder irrespective of the on or off condition of the monitor, and wherein the monitor further includes means for processing the resultant video signal and for coupling the processed video signal to the decoder's detector, a source of horizontal rate pulses for coupling thereof to the clock input of the counter, and a source of vertical blanking pulses for resetting the counter, and wherein the decoder includes means responsive to a video signal received at said further input for turning the monitor on.

21. In a system for remotely adjusting the control functions of at least one television monitor, an encoder comprising:

a sync separator receiving an input video signal for developing a vertical sync output and a horizontal sync output;

a counter having a reset input, a clock input and a plurality of outputs, said counter receiving at its reset input the vertical sync output of the sync separator and receiving at its clock input the horizontal sync output of the sync separator so as to develop sequential pulse outputs in response to sequential horizontal sync inputs occurring subsequent to the vertical sync input;

a plurality of user-operable controls, each coupled to one of the counter's pulse outputs, for coupling a selected portion of said pulse outputs to a common node for use as user-variable control signals;

a multivibrator adapted to generate a control pulse of a given width in response to a user-variable control signal of a given value;

means for coupling said user-variable control signals to the multivibrator such that the multivibrator generates a plurality of sequential control pulses whose widths are a function of the values of said control signals; and means for combining the pulse outputs from the multivibrator with the input video signal to develop a resultant video signal in which the control pulses are inserted into the vertical interval of the input video signal.

* * * * *